(12) United States Patent
Montero et al.

(10) Patent No.: US 10,268,616 B2
(45) Date of Patent: Apr. 23, 2019

(54) SYSTEMS AND METHODS FOR SELECTIVE DISABLEMENT OF PROTOCOLS ON A USB TYPE-C PORT

(71) Applicant: DELL PRODUCTS L.P., Round Rock, TX (US)

(72) Inventors: Adolfo S. Montero, Pflugerville, TX (US); James T. Gillon, Round Rock, TX (US); Marcin M. Nowak, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/666,155

(22) Filed: Aug. 1, 2017

(65) Prior Publication Data
US 2019/0042503 A1    Feb. 7, 2019

(51) Int. Cl.
| | |
|---|---|
| *G06F 1/16* | (2006.01) |
| *G06F 13/38* | (2006.01) |
| *G06F 13/42* | (2006.01) |
| *G06F 9/4401* | (2018.01) |

(52) U.S. Cl.
CPC .......... *G06F 13/385* (2013.01); *G06F 1/1632* (2013.01); *G06F 9/4401* (2013.01); *G06F 13/4282* (2013.01); *G06F 2213/0026* (2013.01)

(58) Field of Classification Search
CPC ..... H04L 63/08; H04L 63/20; H04L 63/1441; H04L 41/28; G06F 21/44; G06F 1/1632; G06F 13/4282; G06F 21/85; G06F 21/70; G06F 2221/2129

USPC .... 713/168, 155, 182, 189, 169, 170; 726/2, 726/3, 4, 17, 26; 710/303, 8, 304, 62, 710/300, 36

See application file for complete search history.

(56) References Cited

U.S. PATENT DOCUMENTS

| | | | |
|---|---|---|---|
| 7,925,817 B2* | 4/2011 | Uehara | G06F 11/2033 710/305 |
| 8,122,171 B2* | 2/2012 | Wetzel | G06F 13/385 710/104 |
| 8,621,195 B2 | 12/2013 | Wang et al. | |
| 9,684,805 B2* | 6/2017 | Raskin | G06F 21/85 |
| 2006/0203715 A1* | 9/2006 | Hunter | H04L 12/4641 370/216 |
| 2006/0206602 A1* | 9/2006 | Hunter | H04L 49/557 709/223 |
| 2008/0005415 A1 | 1/2008 | Lopez et al. | |
| 2008/0244108 A1 | 10/2008 | Abramson et al. | |

(Continued)

*Primary Examiner* — Faisal M Zaman
(74) *Attorney, Agent, or Firm* — Egan Peterman Enders Huston (57) ABSTRACT

Embodiments of systems and methods for selectively enabling and disabling protocols of a USB-C port are provided herein. According to one embodiment, a method for selectively enabling one or more protocols of a USB-C port on an information handling system (IHS) includes determining, upon system boot, if the IHS is connected via the USB-C port to a peripheral device that is authorized for use with the information handling system. If the peripheral device is not authorized for use with the IHS, the method may disable all protocols of the USB-C port. If the peripheral device is authorized for use with the IHS, the method may enable one or more protocols of the USB-C port.

20 Claims, 4 Drawing Sheets

(56) References Cited

U.S. PATENT DOCUMENTS

| | | | |
|---|---|---|---|
| 2014/0047260 A1* | 2/2014 | Iijima | G06F 1/3287 |
| | | | 713/324 |
| 2014/0344886 A1* | 11/2014 | Gillon | G06F 21/00 |
| | | | 726/1 |
| 2016/0112421 A1 | 4/2016 | Wang et al. | |
| 2016/0328579 A1* | 11/2016 | Jois | G06F 21/56 |
| 2016/0378971 A1* | 12/2016 | Dunstan | G06F 21/44 |
| | | | 726/17 |
| 2017/0017595 A1* | 1/2017 | Schnell | G06F 13/385 |
| 2017/0109312 A1 | 4/2017 | Voor et al. | |
| 2017/0177029 A1* | 6/2017 | Nguyen | G06F 1/1632 |

\* cited by examiner

SYSTEMS AND METHODS FOR SELECTIVE DISABLEMENT OF PROTOCOLS ON A USB TYPE-C PORT

FIELD

This invention relates generally to information handling systems having Universal Serial Bus (USB) Type-C ports, and more particularly, to systems and methods for selectively enabling and disabling protocols on USB Type-C ports.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often equipped with various types of communication interfaces, which enable data and/or power delivery to and from the system. One example is the Universal Serial Bus (USB) interface. USB is an industry standard developed by the USB Implementers Forum (USB IF), which defines characteristics of the cables, connectors and communications protocols used in a bus for connection, communication, and power delivery between information handling systems and other electronic devices. USB is currently used in many different types of information handling systems (such as desktops, laptops, tablets, mobile phones, PDAs, etc.) and accessories (such as keyboards, mice, power supplies and chargers, spare battery packs, docking stations, external hard drives, audio headsets, speakers, cameras, etc.). USB interfaces may take various forms, including both wired and wireless interfaces, and enable information handling systems and accessories to communicate according to a variety of data communication standards, such as USB 1.0, USB 2.0, USB 3.0, and USB 3.1, as well as any future revisions thereof.

For security purposes, some users (such as corporate and government entities) may wish to disable one or more USB ports on an information handling system to prevent information from being uploaded to/downloaded from the information handling system. For example, USB ports may be disabled on an information handling system to prevent a person from downloading sensitive or propriety information from the information handling system onto a USB storage device plugged into a USB connector. In another example, it may be desirable to disable USB ports on an information handling system to prevent an attached USB storage device from uploading malicious software to the system.

To prevent security breaches, a system administrator may disable all USB ports on an information handling system by modifying associated settings in the system's Basic Input/Output System (BIOS). Once USB ports are disabled in BIOS, the USB port settings cannot be changed manually by an unauthorized user or automatically by the system, until such settings are re-configured by the system administrator. One problem with this port disablement solution is that an information handling system cannot communicate with an attached peripheral device through a USB port when the USB ports on the system are disabled.

SUMMARY OF THE INVENTION

The following description of various embodiments of information handling systems and related methods is not to be construed in any way as limiting the subject matter of the appended claims.

According to various embodiments of the present disclosure, improved information handling systems and methods are provided herein for selectively enabling one or more protocols associated with a USB-C port on an information handling system. In one embodiment, the systems and methods provided herein may disable all USB ports on the information handling system and on an attached peripheral device, while enabling or maintaining other functionality of the peripheral device. In one embodiment, the attached peripheral device may be a docking station having, for example, audio, video and/or networking functionality. In such an embodiment, an information handling system coupled to a docking station may utilize, for example, the audio, video and/or networking capabilities of the attached docking station, even though USB ports on the information handling system and the docking station remain disabled. In another embodiment, the systems and methods provided herein may selectively disable one or more protocols (e.g., USB, DisplayPort, and/or Thunderbolt™ protocols) associated with a USB-C port on an information handling system. Although exemplary embodiments of the systems and methods provided herein describe an information handling system docked with a docking station, alternative embodiments may function similarly when the information handling system is attached to other peripheral devices (e.g., USB dongles, display devices, etc.). As such, the disclosure provided herein is intended to cover all such embodiments.

According to one embodiment, a method is provided herein for selectively enabling one or more protocols of USB-C ports on an information handling system (IHS) and a peripheral device, where the IHS is not initially attached to the peripheral device. In this embodiment, the method may begin by disabling all protocols of the USB-C port (and optionally) one or more additional USB ports on the IHS) upon system boot. As used herein, "system boot" refers to both the "cold boot" and "hot-plug" case. Sometime thereafter, the method may detect a connection via the USB-C port to a peripheral device, and may determine if the attached peripheral device is authorized for use with the information handling system. In one embodiment, the steps of detecting a connection to a peripheral device and determining if the attached peripheral device is authorized for use with the information handling system may involve messages communicated over a communication channel (CC) link of the USB-C port. The CC link remains enabled even when one or more protocols of the USB-C port are disabled.

If the attached peripheral device is not authorized for use with the information handling system, the method may maintain disablement of the protocols of the USB-C port (and optionally all USB ports on the IHS). If the attached peripheral device is authorized for use with the information handling system, however, the method may send boot parameters to the peripheral device to configure the peripheral device, and may enable one or more protocols of the USB-C port on the information handling system once configuration is complete. In one embodiment, the boot parameters may be sent to the peripheral device via the CC link of the USB-C port.

A USB-C port generally includes a USB-C connector (e.g., a USB-C receptacle or plug) and a number of protocols, including USB, DisplayPort, and Thunderbolt™ protocols, etc. and provides support for power delivery via the USB-C connector. In some embodiments, prior to the step of sending boot parameters, the method may include receiving instructions to disable at least one protocol of the USB-C port, and to enable the one or more protocols of the USB-C port. In such embodiments, the boot parameters sent to the peripheral device may include boot parameters to disable data connections within the peripheral device corresponding to the at least one protocol, while enabling data connections within the peripheral device corresponding to the one or more protocols. In one example, the boot parameters sent to the peripheral device may be used to disable USB data connections within the peripheral device, while enabling audio, video and/or networking data connections within the peripheral device.

In some embodiments, the peripheral device may be a docking station including a USB-C port and one or more additional USB ports, and the at least one protocol may be a USB protocol. In such embodiments, the step of sending boot parameters may include sending boot parameters to the docking station to disable USB data connections to all USB ports downstream of the USB-C port on the docking station, while enabling data connections within the docking station corresponding to the one or more protocols. Although not strictly limited to such, the data connections within the docking station corresponding to the one or more protocols may include audio, video and/or networking data connections.

After the boot parameters are sent to the peripheral device (e.g., a docking station), the method may receive a message from the peripheral device indicating that configuration on the docking station side is complete. In one embodiment, the message may be communicated over the CC links of the attached USB-C ports. In some embodiments, the one or more protocols of the USB-C port on the information handling system may be enabled in response to receiving the message. After the one or more protocols of the USB-C port on the information handling system are enabled, the method may communicate data corresponding to the one or more protocols between the information handling system and the peripheral device via the USB-C port. In some embodiments, the data may be communicated across four pairs of USB Type-C SuperSpeed+ data lanes of the USB-C port.

According to another embodiment, a method is provided herein for selectively enabling one or more protocols of USB-C ports on an information handling system (IHS) and on an attached peripheral device. In this embodiment, the method may begin by determining, upon system boot, if the information handling system is connected via a USB-C port to a peripheral device that is authorized for use with the information handling system. In one embodiment, messages communicated over a communication channel (CC) link of the USB-C port may be used to determine if the attached peripheral device is authorized for use with the information handling system. If the peripheral device is not authorized for use with the information handling system, the method may disable all protocols of the USB-C port on the information handling system. If the peripheral device is authorized for use with the information handling system, however, the method may enable one or more protocols of the USB-C port.

In some embodiments, prior to the step of enabling the one or more protocols, the method may include receiving instructions to disable at least one protocol of the USB-C port, and to enable the one or more protocols of the USB-C port. In addition, the method may include sending boot parameters to the peripheral device via the USB-C port to disable data connections within the peripheral device corresponding to the at least one protocol, and to enable data connections within the peripheral device corresponding to the one or more protocols. In such embodiments, the boot parameters sent to the peripheral device may include boot parameters to disable data connections within the peripheral device corresponding to the at least one protocol, and to enable data connections within the peripheral device corresponding to the one or more protocols. In one embodiment, the boot parameters may be sent to the peripheral device via the CC link of the USB-C port.

In some embodiments, the peripheral device may be a docking station including a USB-C port and one or more additional USB ports. In such embodiments, the step of sending boot parameters may include sending boot parameters to the docking station to disable USB data connections to all USB ports downstream of the USB-C port on the docking station. In some embodiments, the step of sending boot parameters may further include sending boot parameters to the docking station to enable data connections within the docking station corresponding to the one or more protocols. Although not strictly limited to such, the data connections within the docking station corresponding to the one or more protocols may include audio, video and/or networking data connections.

After the boot parameters are sent to the peripheral device (e.g., a docking station), the method may receive a message from the peripheral device indicating that configuration on the peripheral device side is complete. In one embodiment, the message may be communicated over the CC links of the attached USB-C ports. In response to receiving the message and enabling the one or more protocols, the method may communicate data corresponding to the one or more protocols between the information handling system and the peripheral device via the USB-C port. In some embodiments, the data may be communicated across four pairs of USB Type-C SuperSpeed+ data lanes of the USB-C port.

According to one embodiment, a system provided herein includes an information handling system and a docking station, each including a USB-C port for attaching or docking the information handling system to the docking station. It is noted, however, that alternative embodiments of the system may include other peripheral devices having a USB-C port (e.g., USB dongles, display devices, etc.) in place of, or in addition to, a docking station.

In one embodiment, the information handling system may be provided herein with at least a USB-C port, a first processing device and a second processing device, which is coupled to the first processing device. Although not strictly limited to such, the first processing device may be a power delivery (PD) controller and the second processing device may be an embedded controller, in one embodiment. In general, the first processing device may be coupled to the USB-C port of the information handling system, and may be configured to detect a docking connection to a USB-C port of an attached docking station (or other peripheral device). The second processing device may be configured to determine whether the attached docking station is authorized for use with the information handling system. In one embodiment, a communication channel (CC) link of the USB-C port may be used by the first processing device to detect a docking connection to a USB-C port of an attached docking station, and may be further used by the second processing device to determine if the attached docking station is authorized for use with the information handling system.

If the attached docking station is authorized for use with the information handling system, the second processing device may be further configured to send boot parameters to the docking station to disable USB data connections to all USB ports downstream from the USB-C port on the docking station. In some embodiments, the second processing device may send boot parameters to the docking station to enable other types of data connections within the docking station, such as for example, audio, video and/or networking data connections. In one embodiment, the boot parameters may be sent to the peripheral device via the CC link of the USB-C port.

In some embodiments, the information handling system may include one or more additional USB ports on a chassis of the information handling system. In such embodiments, the one or more additional USB ports and the USB-C port on the information handling system may be disabled: (a) if the information handling system is not docked with a docking station upon system boot, or (b) if the information handling system is docked with a docking station upon system boot, but the second processing device determines that the docking station is not authorized for use with the information handling system.

In some embodiments, the information handling system may further include a third processing device (e.g., an interface controller), which is coupled to the USB-C port and to the first processing device. If the second processing device determines that the docking station is authorized for use with the information handling system, the third processing device may be configured to communicate data to the USB-C port of the information handling system.

In some embodiments, the docking station may include a USB-C port, one or more additional USB ports downstream from the USB-C port, and a fourth processing device (e.g., an embedded controller). In some embodiments, the fourth processing device may be coupled to receive the boot parameters sent from the second processing device in the information handling system.

BRIEF DESCRIPTION OF THE DRAWINGS

Other advantages of the present disclosure will become apparent upon reading the following detailed description and upon reference to the accompanying drawings in which.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

Figure 1:
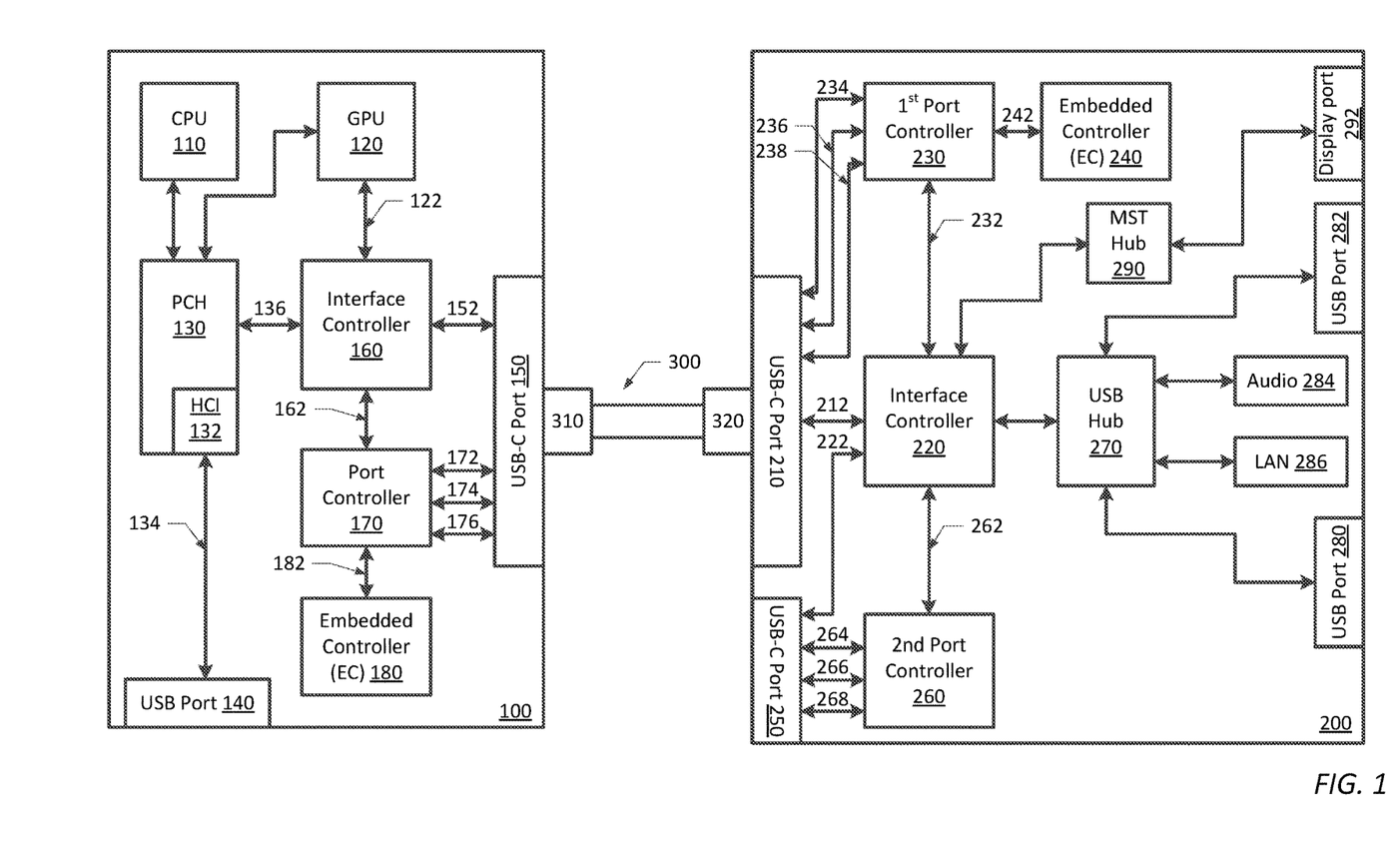
FIG. 1 is a block diagram illustrating one exemplary embodiment of an information handling system coupled to a docking station via USB-C ports.

FIG. 1 is a block diagram of an information handling system 100 (e.g., a desktop computer, laptop computer, tablet computer, MP3 player, personal data assistant (PDA), cell phone, etc.) as it may be configured according to one embodiment of the present disclosure. In this regard, it will be understood that the configuration of FIG. 1 is exemplary only, and that the disclosed methods may be implemented on any other type of information handling system. It will be further understood that while certain components of the information handling system are shown in FIG. 1 for illustrating embodiments of the present disclosure, the information handling system is not restricted to including only those components shown in FIG. 1 and described below.

As shown in FIG. 1, information handling system (IHS) 100 may generally include one or more processing devices, such as a central processing unit (CPU) 110 for executing an operating system (OS) for system 100. CPU 110 may include any type of processing device, such as an Intel Pentium series processor, an Advanced Micro Devices (AMD) processor or another processing device. In some embodiments, information handling system 100 may include other types of processing devices including, but not limited to, a graphics processor unit (GPU) 120, a graphics-derivative processor (such as a physics/gaming processor), a digital signal processor (DSP), etc. Although GPU 120 is shown as a separate processing device in the embodiment of FIG. 1, GPU 120 may be omitted in other embodiments, when the functionality provided thereby is integrated within CPU 110 in a system-on-chip (SoC) design.

In the embodiment of FIG. 1, CPU 110 and GPU 120 are coupled to platform controller hub (PCH) 130, which controls certain data paths and supports functions of the CPU and GPU. For example, PCH 130 may include a real-time system clock, a Peripheral Controller Interconnect (PCI) controller and/or other integrated controllers, such as host controller interface (HCI) 132. Although shown in the embodiment of FIG. 1, PCH 130 may be omitted in other embodiments, when the functionality provided thereby is integrated within CPU 110 in a system-on-chip (SoC) design.

In the embodiment of FIG. 1, HCI 132 is coupled to USB bus 134 for controlling one or more USB port(s) 140 housed, for example, on the chassis or housing of IHS 100. In such embodiments, HCI 132 may be referred to as a USB host controller. In general, a USB host controller provides an interface for other system components to utilize USB hubs and USB devices connected to one or more USB port(s) 140, and may be implemented as a combination of hardware, software or firmware. In one embodiment, HCI 135 may be an extensible host controller interface (xHCI), which is capable of interfacing with USB 1.x, USB 2.0, and USB 3.x devices. However, HCI 132 is not restricted to an xHCI, and may be implemented with other USB host controllers, such as an open host controller interface (OHCI), a universal host controller interface (UHCI) and an enhanced host controller interface (EHCI), in other embodiments.

A USB port is generally defined a point of access conforming to a USB Specification (e.g., the USB 1.x, USB 2.0, and/or USB 3.x Specification), and provides a point of attachment for a USB device to couple with a USB bus. A USB port generally includes a USB connector and associated logic including controllers and muxes. In the example embodiment of FIG. 1, the one or more USB port(s) 140 may include one or more USB connector(s) selected from a group including a USB Type-A connector, a USB Type-A SuperSpeed connector, a USB Type-B connector, a USB Type-B SuperSpeed connector, a mini-A connector, a mini-B connector, a mini-AB connector, a micro-AB connector, a micro-B connector, a micro-B SuperSpeed connector and a USB Type-C connector. In most embodiments, the USB connector(s) housed on the chassis or housing of IHS 100 may be receptacles; however, plugs may be included in other embodiments.

In addition to USB ports 140, IHS 100 includes at least one USB Type-C port 150, which may be utilized as a docking connector for establishing a docking connection to a docking station 200 having its own USB Type-C port 210. However, USB Type-C port 150 is not strictly limited to being used as a docking connector, and may alternatively be used to establish a USB connection to other peripheral devices (e.g., USB dongles, display devices, etc.) and/or to receive power from a power source.

In one embodiment, a USB cable 300 having USB connectors 310 and 320 may be used to connect the USB Type-C port 150 of IHS 100 to the USB Type-C port 210 of docking station 200 (or to a USB Type-C port of another peripheral device). In other embodiments, the USB cable 300 shown in FIG. 1 may be omitted when a USB connector (e.g., a receptacle) within USB Type-C port 150 is coupled directly to a USB connector (e.g., a plug) within USB Type-C port 210.

The USB cable 300 shown in FIG. 1 may be an active cable (i.e., having circuitry within its connectors) or a passive cable (i.e., having no circuitry within its connectors). In some embodiments, USB cable 300 may include a plurality of data lines or channels for communicating USB data, DisplayPort (or other video) data, Thunderbolt™ data, and/or other data known in the art between IHS 100 and docking station 200 (or another peripheral device). USB cable 300 may further include a plurality of power and control lines for communicating power and configuration information between IHS 100 and docking station 200 (or another peripheral device). In one embodiment, USB cable 300 may be a Thunderbolt™ Type-C cable. In another embodiment, USB cable 300 may be a USB Type-C cable.

The USB Type-C Cable and Connector Specification and the USB Power Delivery Specification describe USB receptacle and plug (collectively referred to herein as "connectors") and cable configurations that provide a smaller, thinner and more robust alternative to the USB 3.1 interface (i.e., standard and micro USB cables and connectors). USB Type-C receptacles were originally designed for use within very thin platforms, such as ultra-thin laptops, tablets and smartphones, but may be used within substantially any information handling system and peripheral device. A USB Type-C plug provides greater ease of use by enabling the plug to be inserted into a USB Type-C receptacle right side-up or upside-down. Similarly, a USB Type-C cable enhances ease of use by being plug-able in either direction between host and device.

Figure 2:
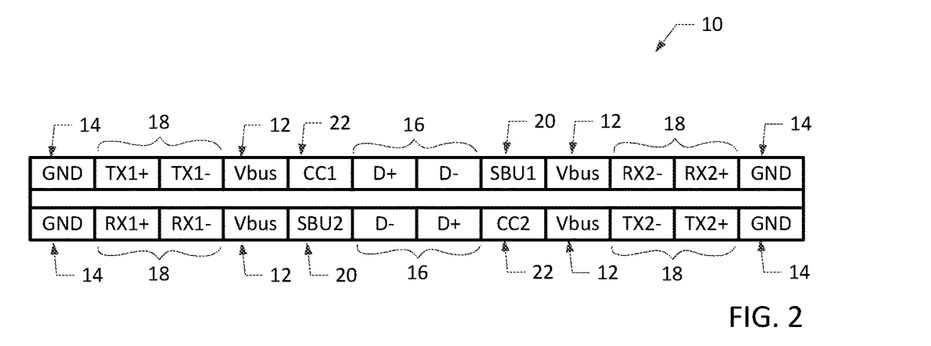
FIG. 2 is a functional diagram of a USB-C receptacle.
Figure 3:
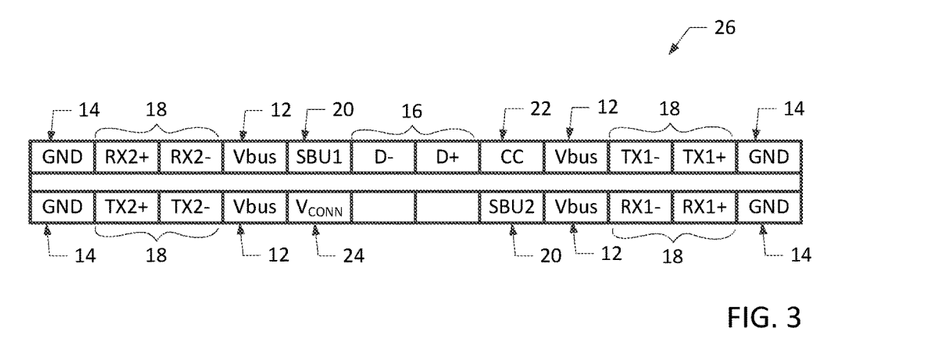
FIG. 3 is a functional diagram of a USB-C plug.

FIGS. 2 and 3 illustrate functional diagrams of USB-C receptacles and plugs, respectively. As shown in FIG. 2, USB Type-C receptacle 10 comprises 26 pins including two pairs of power pins (VBUS) 12, two pairs of ground pins (GND) 14, two differential pairs of USB 2.0 data bus pins (D+/−) 16, four pairs of USB 3.x high speed data bus pins (TX and RX) 18, two sideband use pins (SBU1, SBU2) 20 and two configuration channel pins (CC1, CC2) 22.

As shown in FIG. 3, USB Type-C plug 26 comprises 24 pins including two pairs of power pins (VBUS) 12, two pairs of ground pins (GND) 14, four pairs of USB 3.x high speed data bus pins (TX and RX) 18, and two sideband use pins (SBU1, SBU2) 20. Unlike receptacle 10, plug 26 includes only one differential pair of USB 2.0 data bus pins (D+/−) 16 and only one configuration channel pin (CC) 22. In addition, plug 26 includes a voltage connect pin (VCONN) 24 to provide power to circuits within the plug. When plug 26 is inserted into receptacle 10, one of the CC pins (CC1 or CC2) in the receptacle is connected to the CC pin 22 in the plug 26 to establish signal orientation. The other CC pin (CC1 or CC2) in receptacle 10 may be repurposed as VCONN for powering circuits within the plug.

In USB Type-C connectors, the configuration channel (CC1, CC2) pins are used for detecting cable attach and detach, detecting plug orientation (i.e., right side-up or upside-down), and detecting/configuring VBUS and VCONN, as well as Alternate and Accessory Modes. The CC pins are also used to transmit and receive communication messages, such as control messages, data messages, extended messages and vendor defined messages (VDMs). Vendor Defined Messages (VDMs), including structured and unstructured VDMs, allow devices to exchange information not defined by the USB specifications. Structured VDMs are used to send information about, and agree on, Alternate and Accessory Modes. Alternate Modes include standard Alternate Modes, such as DisplayPort (DP) over USB-C, Mobile High Definition Link (MHL) over USB-C, and High Definition Multimedia Interface (HDMI) over USB-C, and vendor-specific Alternate Modes, such as Thunderbolt™ over USB-C.

When a USB Type-C connector is configured in an Alternate Mode, certain pins of the connector are reconfigured for communicating non-USB data, such as DisplayPort, MHL, HDMI and Thunderbolt™ data. In a full-featured cable, the eight USB 3.x high speed data bus pins (TX and RX) 18 and two sideband use pins (SBU1, SBU2) 20 shown in FIGS. 2 and 3 are reconfigured for communicating non-USB data in Alternate Mode. If the IHS has a "captive cable" (cannot be unplugged) or a "direct connect application" (plug orientation is otherwise assured), three more pins are available for reconfiguration (e.g., VCONN pin 24 and the two adjacent pins shown in FIG. 3) in Alternate Mode.

Returning to FIG. 1, IHS 100 includes interface controller 160, power delivery (PD) controller 170, and embedded controller 180 for configuring USB Type-C port 150 and controlling communications thereacross. However, it will be understood that the methodologies described herein for interface controller 160, power delivery (PD) controller 170, and/or embedded controller 180 may be implemented by any combination of one or more processing devices, which are configured to execute program instructions to perform one or more steps of the methodologies disclosed herein.

Examples of processing devices include a programmable integrated circuit (e.g., processor such as a controller, microcontroller, microprocessor, ASIC, etc.) or a programmable logic device "PLD" (such as a field programmable gate array "FPGA", complex programmable logic device "CPLD", etc.). The program instructions may include an ordered listing of executable instructions for implementing logical functions in an information handling system or component thereof. The executable instructions may include a plurality of code segments operable to instruct components of an information handling system to perform the methodologies disclosed herein. It will also be understood that one or more steps of the present methodologies may be employed in one or more code segments of a computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

According to one embodiment, interface controller 160 may be coupled to PCH 130 via PCI express (PCIe) link 136 for receiving USB data and control information from CPU 110, and may be coupled to GPU 120 via display link 122 for receiving DisplayPort (or other audio/video) data, as shown in FIG. 1. In other embodiments, interface controller 160 may be coupled directly to CPU 110 when the functionalities of PCH 130 and GPU 120 are integrated within CPU 110 in a system-on-chip (SoC) design. In such embodiments, interface controller 160 may receive data, audio and video through one or more interfaces within the SoC.

In one example embodiment, interface controller 160 may be a Thunderbolt3™ controller developed by Intel. However, interface controller 160 is not limited to a Thunderbolt3™ controller, and may be alternatively implemented in other embodiments. As known in the art, a Thunderbolt3™ controller supports bi-directional PCIe and DisplayPort protocols, provides 40 Gbps bandwidth, provides up to 100 W power delivery (via USB power delivery) and utilizes USB Type-C connectors, such as a USB-C connector included within USB Type-C port 150. When interface controller 160 is a Thunderbolt3™ controller, Thunderbolt™, DisplayPort and USB 3.x data may be communicated between interface controller 160 and USB Type-C port 150 via Thunderbolt™ (TBT) link 152, which may include four pairs of USB Type-C SuperSpeed+ data lanes. Although not shown in FIG. 1, interface controller 160 may further include a USB host controller, such as an xHCI, in some embodiments. In such embodiments, the USB host controller included within interface controller 160 may provide an interface to a USB hub (not shown), additional USB ports (not shown) or other system components that may be included within IHS 100.

Power Delivery (PD) controller 170 is coupled to USB Type-C port 150 for establishing and managing the connection and information exchange between IHS 100 and an attached peripheral device, as well controlling power transfer. For example, and as described in more detail below, PD controller 170 may be configured for negotiating and managing power contracts and data modes, such as DisplayPort Alternate mode (video/audio), USB and Thunderbolt™ Alternate mode (video/data) with downstream devices connected to USB Type-C port 150. In conjunction with embedded controller 180, PD controller 170 is also configured for enabling/disabling protocols supported by USB Type-C port 150.

As shown in FIG. 1, PD controller 170 is coupled to USB Type-C port 150 via a plurality of links or channels, including but not limited to, VBUS power line 172, Communication Channel (CC) 174, USB/Video data channels 176. More specifically, port controller 170 is coupled to: (a) VBUS power line 172 for sourcing/sinking power to the VBUS power pins (12, FIGS. 2, 3) of USB-C port 150; (b) CC 174 for transmitting and receiving configuration channel (CC) information to/from one of the CC pins (22, FIGS. 2, 3) of USB-C port 150; and (c) USB/Video channels 176 for transmitting and receiving USB 2.0 data to/from the USB 2.0 data bus pins (D+/−) (16, FIGS. 2, 3), and for transmitting and receiving Alternate Mode data to/from the SBU pins (20, FIGS. 2, 3) of USB-C port 150. In some cases, PD controller 170 may be coupled for supplying VCONN current to the other CC pin (22, FIGS. 2, 3) of USB-C port 150 via CC 174. Through the Inter-Integrated Circuit ($I^2C$) link 162 to interface controller 160, PD controller 170 may be further coupled to communicate with an attached peripheral device including, but not limited to, docking station 200.

Embedded controller (EC) 180 is coupled to PD controller 170 via $I^2C$ link 182 for controlling communication across USB-C port 150. As described in more detail below, EC 180 is further coupled to receive USB port disablement settings from the system BIOS for enabling and disabling USB ports (e.g., USB ports 140 and 150) on IHS 100 and on a peripheral device (such as docking station 200) coupled thereto. In addition, EC 180 may comprise and/or may be configured to execute program instructions to perform various functions and methods in accordance with the present disclosure.

In some embodiments, information handling system 100 may be connected to docking station 200 (otherwise referred to as a "dock"), either through a direct connection between USB-C port 150 (e.g., a receptacle) and USB-C port 210 (e.g., a plug), or via a USB cable 300 connecting USB-C port 150 to USB-C port 210. Similar to information handling system 100, docking station 200 may include an interface controller 220, a first power delivery (PD) controller 230, and an embedded controller 240 for configuring USB-C port 210 and controlling communications thereacross. As noted above, interface controller 220, first power delivery (PD) controller 230, and embedded controller 240 may be implemented by circuitry or by processing devices configured to execute program instructions.

Although not strictly limited to such, interface controller 220 may in one embodiment be a Thunderbolt3™ controller, which is coupled and configured for communicating Thunderbolt™, DisplayPort and USB 3.x data between interface controller 220 and USB-C port 210 via a Thunderbolt™ (TBT) link 212, which may include four pairs of USB Type-C SuperSpeed+ data lanes. In some embodiments, interface controller 220 may further include a USB host controller, such as an xHCI, for communicating USB 2.0 data and Alternate Mode data via an $I^2C$ link 262 to a second PD controller 260, which is coupled to a second USB Type-C port 250 on the docking station. In FIG. 1, interface controller 220 is coupled to USB-C Port 250 via a second TBT link 222 for communicating Thunderbolt™, Display- Port and USB 3.x data to/from USB Type-C port 250. In FIG. 1, the first PD controller 230 is coupled to interface controller 220 via I²C link 232 for supervising the communication of data across USB-C port 250.

The first PD controller 230 is coupled to USB Type-C port 210 for establishing and managing the connection and information exchange between docking station 200 and IHS 100, and for controlling power transfer. In conjunction with embedded controller 240, PD controller 230 is further configured for enabling/disabling protocols supported by the USB-C port 210. Likewise, the second PD controller 260 is coupled to USB Type-C port 250 for performing similar functions for USB-C port 250. Similar to the PD controller 170 included within IHS 100, the PD controllers 230/260 included within docking station 200 are respectively coupled to USB Type-C ports 210/250 via a plurality of links or channels, including but not limited to, VBUS power lines 234/264, Communication Channels (CC) 236/266, and USB/Video data channels 238/268 These links are coupled to corresponding pins within USB Type-C ports 210/250 to enable the PD controllers 230/260 and interface controller 220 within docking station 200 to provide the same functionality described above with regard to FIGS. 2 and 3.

When USB-C Port 210 is used as a docking connector for the docking station, the first PD controller 230 may be configured for negotiating and managing power contracts and data modes, such as DisplayPort Alternate mode (video/audio), USB and Thunderbolt™ Alternate mode (video/data) with upstream devices connected to USB Type-C port 210 (such as IHS 100). In such embodiments, the embedded controller (EC) 240 within docking station 200 may be coupled to the first PD controller 230 via I²C link 242 for controlling communication across USB-C port 210. According to one embodiment, EC 240 may comprise and/or may be configured to execute program instructions to perform various functions and methods in accordance with the present disclosure.

As known in the art, a docking station may generally be used to provide greater connectivity and additional functionality to a docked information handling system. In the example embodiment shown in FIG. 1, docking station 200 includes a number of USB ports (e.g., USB ports 280 and 282) and a number of display ports (e.g., display port 292) on the chassis of the docking station for communicating with USB devices and display devices that may be connected or plugged into those ports. In addition, Audio Codec 284 and LAN (Local Area Network) NIC (Network Interface Card) 286 may be included within docking station 200 to provide audio and networking functionality to the docking station. Although not expressly illustrated in FIG. 1, other components and/or ports may be included within docking station 200 to enhance the functionality provided thereby.

In the embodiment shown in FIG. 1, docking station 200 includes USB hub 270, which is coupled for controlling and communicating with one or more USB ports, such as USB ports 280 and 282, and other docking system components, such as Audio Codec 284 and LAN NIC 286. USB hub 270 is coupled for controlling and communicating USB 2.0 and USB 3.x data to/from USB ports 280 and 282. The USB ports 280 and 282 coupled to the hub may include substantially any type of USB connector described above. In addition, USB hub 270 is coupled for controlling and communicating audio information to Audio Codec 284, and networking information to LAN NIC 286. USB hub 270, however, is not restricted to interfacing with only those ports and components shown in FIG. 1. In other embodiments, USB hub 270 may be coupled to a fewer or greater number of USB ports and/or other USB devices (e.g., an SD card controller).

In some embodiments, docking station 200 may include one or more additional hubs. For example, docking station 200 may include a multi-stream transport (MST) hub 290, which is configured to communicate video information to/from one or more display ports (e.g., display port 292) included on the chassis of the docking station. The one or more display ports may include substantially any type of display port, such as a mini display port, VGA port, and HDMI port.

As noted above, it is sometimes desirable to disable USB ports on an information handling system to prevent information from being uploaded to/downloaded from the information handling system. For example, it may be desirable to disable USB ports on an information handling system to prevent a person from downloading sensitive or propriety information from the information handling system onto a USB storage device. In another example, it may be desirable to disable USB ports on an information handling system to prevent an attached USB storage device from uploading malicious software to the system.

One known solution to prevent security breaches is for a system administrator to disable all USB ports on an information handling system by modifying associated settings in system BIOS. Once USB ports are disabled in BIOS, the USB port settings typically cannot be changed, until such settings are re-configured by the system administrator. However, a problem arises in this solution when an information handling system and docking station are connected through USB port docking connectors (150, 210), as shown in FIG. 1. When the USB ports on an information handling system are disabled in system BIOS, all communication between the information handling system and docking station is lost, rendering the docking station useless.

According to various embodiments of the present disclosure, improved information handling systems and methods are provided herein for selectively enabling one or more protocols associated with a USB-C port on an information handling system. In one embodiment, the systems and methods provided herein may disable all USB ports on the information handling system and on an attached docking station, while enabling or maintaining other docking station functionality. In this manner, an information handling system coupled to a docking station may utilize, for example, the audio, video and/or networking capabilities of the docking station, even though USB ports on the information handling system and the docking station remain disabled. This maintains docking station utility without sacrificing security. In another embodiment, the systems and methods provided herein may selectively enable one or more protocols (e.g., USB, DisplayPort, and/or Thunderbolt™ protocols) associated with a USB-C port on an information handling system and attached peripheral device, while possibly disabling at least one additional protocol of the USB-C port. In this manner, the systems and methods provided herein may enable a user, system administrator or manufacturer to choose the type of information allowed to pass through the USB-C port.

Figure 4:
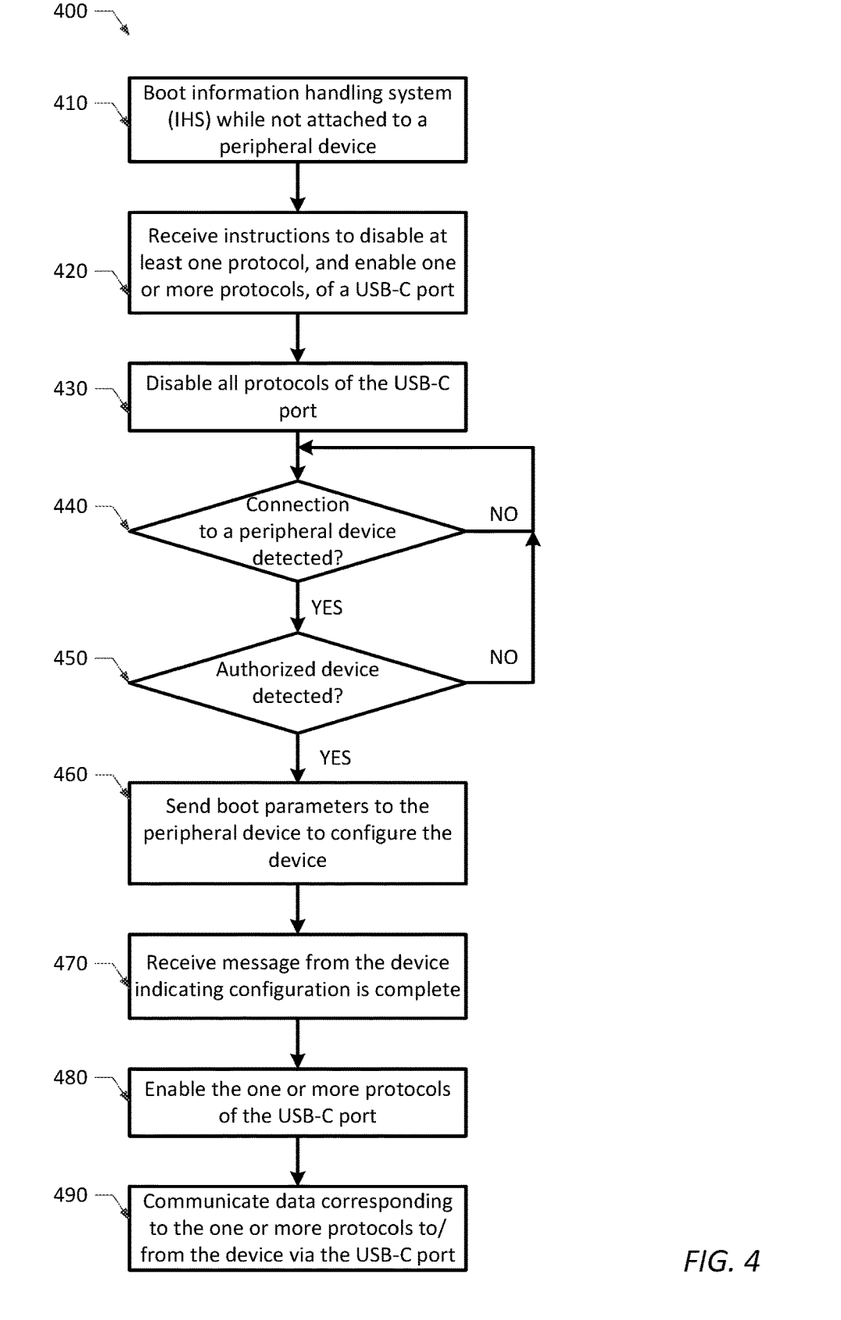
FIG. 4 is flowchart diagram illustrating one embodiment of a method for disabling USB ports and/or for selectively disabling one or more protocols of USB-C ports on an information handling system (IHS) and a peripheral device, where the IHS is not initially attached to the peripheral device.
Figure 5:
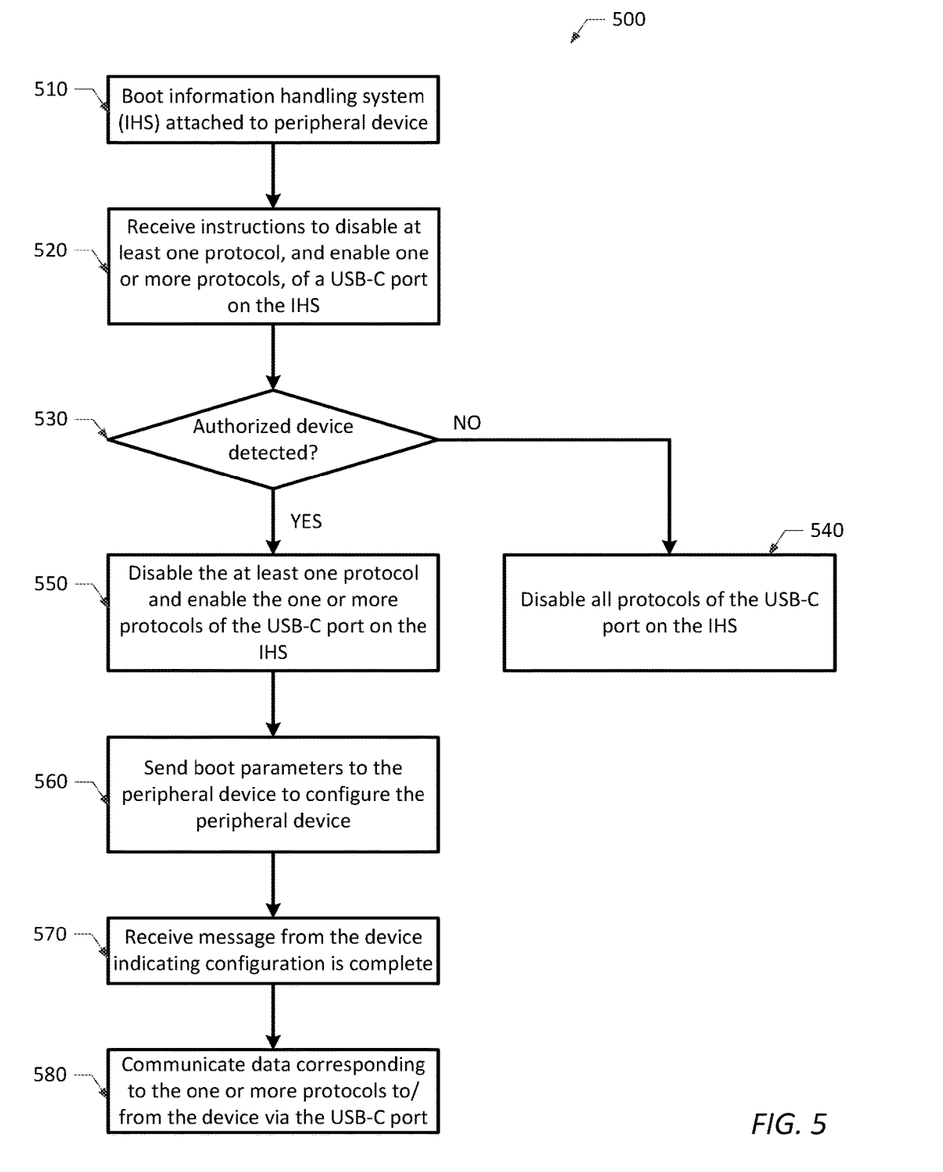
FIG. 5 is flowchart diagram illustrating one embodiment of a method for disabling USB ports and/or for selectively disabling one or more protocols of USB-C ports on an information handling system and an attached peripheral device.

FIGS. 4 and 5 are flowchart diagrams illustrating various methods according to the present disclosure. Generally speaking, the method steps shown in FIGS. 4 and 5 may be performed by various components of an information handling system, such as embedded controller 180, PD controller 170, interface controller 160 and USB-C port docking connector 150. As such, the method steps shown in FIGS. 4 and 5 may be performed by a combination of hardware, software and/or firmware included within the information handling system.

In some embodiments of the methods shown in FIGS. 4 and 5, USB ports on an information handling system (IHS) are disabled to prevent security breaches and unauthorized access thereto. In other embodiments, the methods shown in FIGS. 4 and 5 may be used to selectively enable one or more protocols (e.g., USB, DisplayPort, and/or Thunderbolt™ protocols) of USB-C ports on the IHS and a peripheral device attached thereto, while possibly disabling at least one additional protocol of the USB-C ports. The method shown in FIG. 4 illustrates an embodiment of a method performed by an information handling system that is not initially attached to a peripheral device upon system boot (e.g., an IHS that is not initially docked with a docking station or connected to another peripheral device). An embodiment of a method performed by an information handling system that is attached to a peripheral device upon system boot is shown in FIG. 5.

In each embodiment, the method presumes that an IHS includes a USB-C port that includes a USB-C connector (e.g., a receptacle) for attaching with a USB-C connector (e.g., a plug) on a peripheral device (e.g., docking station, USB dongle, display device, etc.), either through a direct connection or via a USB-C cable, as shown in FIG. 1 and set forth above. When an IHS is connected to an authorized peripheral device (otherwise referred to as an "authorized device") via the USB-C connectors, the methods shown in FIGS. 4 and 5 may allow data corresponding to selectively enabled protocols of a USB-C port to pass through the USB-C connectors of the IHS and attached peripheral device, while data corresponding to disabled protocols of the USB-C port is prevented from passing through. In one exemplary embodiment, the methods shown in FIGS. 4 and 5 may allow audio, video and/or networking data to pass through the USB-C connectors of the IHS and attached docking station, while USB data connections to all other USB ports on the IHS and peripheral device are disabled. In this manner, the methods shown in FIGS. 4 and 5 may enable a docked IHS to utilize features of the docking station (such as audio, video and/or networking capabilities), while preventing security breaches through USB port disablement.

The method 400 shown in FIG. 4 may generally begin when an IHS not initially connected to a peripheral device (e.g., an undocked IHS) is booted in step 410. When the system is booted, the embedded controller (EC) 180 within IHS 100 may receive instructions (e.g., boot parameters) from the system BIOS to enable one or more protocols of a USB-C port on the IHS and to disable at least one protocol of the USB-C port in step 420. Although not limited to such, system BIOS may send instructions to the embedded controller (EC) 180 within IHS 100 to disable USB and Thunderbolt™ protocols, and to enable the DisplayPort protocol of the USB-C port 150, in one example.

In step 430, the method may disable all protocols of the USB-C port on the IHS until sometime after a connection to an authorized peripheral device is detected. In this step, EC 180 instructs PD controller 170 to disable all protocols of the USB-C port on the IHS (including USB, Thunderbolt™ and DisplayPort protocols), and PD controller 170 performs the requested disablement.

In one embodiment, all other USB ports on the IHS may also be disabled in step 430 upon or at the time of system boot (or upon system start up). This may be achieved in the IHS 100 shown in FIG. 1 by USB port disablement settings in system BIOS, which disable the USB host controllers within PCH 130 and interface controller 160 upon system boot to disable the USB data connections to USB port(s) 140.

In the method shown in FIG. 4, USB-C port 150 (and optionally, the USB port(s) 140 on the IHS) remain disabled until a connection to an authorized peripheral device is detected in steps 440 and 450. As used herein, an "authorized device" is one, which is provided by the manufacturer of the IHS or otherwise authorized for use with the IHS. In one example, PD controller 170 may detect a connection in step 340 via CC link 174, and may send an interrupt to EC 180 in response thereto.

If EC 180 recognizes the peripheral device as an authorized device in step 450 (via identifying data specified, e.g., in a VDM message communicated across the CC link with the embedded controller 240 in docking station 200), EC 180 sends boot parameters to EC 240 to configure the peripheral device in step 460. In some embodiments, EC 180 may send boot parameters via the CC link to EC 240 to disable USB data connections to all USB ports on the peripheral device (e.g., USB ports 250, 280 and 282 of docking station 200) downstream from USB-C port 210. In some embodiments, EC 180 may send boot parameters to EC 240 to enable or maintain other data connections within the peripheral device (such as audio, video and networking data connections). In addition to sending boot parameters to the peripheral device, EC 180 may instruct the PD controller 170 within IHS 100 to enable the Thunderbolt™ Alternate Mode.

In one configuration, the EC 240 in docking station 200 may disable the USB data connections to all USB ports (e.g., USB ports 250, 280 and 282) downstream from USB-C port 210 upon receiving boot parameters from EC 180. If specified in the boot parameters, EC 240 may also enable or maintain other data connections within the docking station. In particular, EC 240 may instruct USB hub 270 to disable USB data connections to USB ports 280 and 282, and to enable communication with Audio Codec 284 and LAN NIC 286. EC 240 may also disable the USB host controller within interface controller 220 to prevent communication of USB 2.0/3.x data to/from USB-C port 250, and may instruct the second PD controller 260 to disable the Thunderbolt™ Alternate Mode to prevent communication of Thunderbolt™ data to/from USB-C port 250. In some embodiments, however, EC 240 may instruct interface controller 220 to allow communication of other Alternate Mode data (e.g., HDMI, MHL and DP data) to/from USB-C port 250, and to allow communication of DisplayPort data (or other video data) to/from display port 292. This configuration enables a docked IHS to utilize the audio, video and networking capabilities of the docking station, while preventing security breaches with disabled USB ports. When configuration is complete on the dock side, EC 240 sends a VDM message to EC 180 over the CC line.

In step 470, EC 180 receives the message from EC 240 indicating that the configuration on the peripheral device side is complete and the one or more protocols of the USB-C port 150 are ready to be enabled. Upon receipt of such message, EC 180 instructs PD controller 170 to renegotiate a contract with first PD controller 230 to enter Thunderbolt™ Alternate Mode, and sends a message to system BIOS to re-enable the USB host controller within interface controller 160 to enable the one or more protocols of the USB-C port 150 in step 480. When a data channel within USB-C port 150 is re-established, interface controller 160 may communicate data corresponding to the one or more protocols to/from docking station 200 across USB-C ports 150 and 210 in step 490. In some embodiments, the data may be communicated across an Alternate Mode channel of the USB-C ports when the USB protocol is disabled.

As noted above, FIG. 5 illustrates an alternative embodiment of a method 500 that may begin when an IHS having an attached peripheral device is booted in step 510. When the system is booted, embedded controller (EC) 180 within IHS 100 may receive instructions (e.g., boot parameters) from the system BIOS to enable one or more protocols of a USB-C port on the IHS and to disable at least one protocol of the USB-C port in step 520. Although not limited to such, the system BIOS may send instructions to the embedded controller (EC) 180 within IHS 100 to disable USB and Thunderbolt™ protocols, and to enable the DisplayPort protocol of the USB-C port 150, in one example.

In the embodiment shown in FIG. 5, the method may determine if an authorized device is connected to the IHS before disabling any USB ports or protocols of the USB-C port on the IHS. In one example, an authorized device may be detected via VMD messages communicated across the CC link between the embedded controllers (e.g., EC 180 and EC 240) in the IHS and the peripheral device.

If an authorized device is not detected in step 530, the method shown in FIG. 5 may disable all protocols of the USB-C port in step 540, thereby restricting access to all functionality provided by the peripheral device. In some embodiments, the method may disable all other USB ports (e.g., USB port(s) 140) on the IHS in step 540 if an authorized device is not detected in step 530. As noted above, USB port(s) 140 may be enabled/disabled by specifying appropriate USB port disablement settings in system BIOS.

If an authorized device is detected in step 530, the method may disable at least one protocol and enable one or more protocols of the USB-C port on the IHS, in step 550. For example, EC 180 may instruct PD controller 170 to disable USB and Thunderbolt™ protocols and enable the DisplayPort protocol, and PD controller 170 may perform the requested enablement/disablement in step 550.

In step 560, the EC 180 in IHS 100 may send boot parameters to the EC 240 in the peripheral device (e.g., docking station 200) to configure the peripheral device. For example, EC 180 may send boot parameters to EC 240 to disable USB data connections to all USB ports on the peripheral device (e.g., USB ports 250, 280 and 282 on docking station 200) downstream from USB-C port 210. In some embodiments, EC 180 may send boot parameters to EC 240 to enable other data connections within the peripheral device.

In one configuration, the EC 240 in docking station 200 may disable the USB data connections to all USB ports (e.g., USB ports 250, 280 and 282) downstream from USB-C port 210 upon receiving boot parameters from EC 180. If specified in the boot parameters, EC 240 may also enable or maintain other functionality provided by the docking station. In particular, EC 240 may instruct USB hub 270 to disable the USB data connections to USB ports 280 and 282, and to enable communication with Audio Codec 284 and LAN NIC 286. EC 240 may also disable the USB host controller within interface controller 220 to prevent communication of USB 2.0/3.x data to/from USB-C port 250, and may instruct second port controller 260 to disable the Thunderbolt™ Alternate Mode to prevent communication of Thunderbolt™ data to/from USB-C port 250. However, EC 240 may instruct interface controller 220 to allow communication of other Alternate Mode data (e.g., HDMI, MHL and DP data) to/from USB-C port 250, and to allow communication of DisplayPort data (or other video data) to/from display port 292. This configuration enables a docked IHS to utilize the audio, video and networking capabilities of the docking station, while preventing security breaches with disabled USB ports. In some embodiments, access to one or more of the audio, video and/or networking capabilities of the docking station may be further controlled or limited by modifying the boot parameters sent to the docking station in step 560. When configuration is complete on the dock side, EC 240 sends a VDM message to EC 180 over the CC line.

In step 570, EC 180 receives the message from EC 240 indicating that the configuration on the peripheral device side is complete. After receipt of such message, interface controller 160 may communicate data corresponding to the one or more enabled protocols to/from the peripheral device across USB-C ports 150 and 210 in step 580. In some embodiments, the data may be communicated across an Alternate Mode channel of the USB-C ports when the USB protocol is disabled.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

It will be understood that one or more of the tasks, functions, or methodologies described herein may be implemented, for example, as firmware or as a computer program of instructions embodied in a non-transitory tangible computer readable medium that is executed by a CPU, controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method for selectively enabling one or more protocols of a first USB-C port on an information handling system, the method comprising:
   disabling all protocols of the first USB-C port on the information handling system upon system boot;
   detecting a connection between the first USB-C port and a second USB-C port on a peripheral device having one or more additional USB ports; and
   determining if the peripheral device is authorized for use with the information handling system, wherein if the peripheral device is authorized for use with the information handling system, the method further comprises:
      sending boot parameters to the peripheral device via the first and second USB-C ports to configure the peripheral device, wherein the boot parameters are configured to disable all USB ports downstream from the second USB-C ports; and
      enabling one or more protocols of the first USB-C port on the information handling system once configuration is complete.

2. The method recited in claim 1, wherein if the peripheral device is not authorized for use with the information handling system, the method further comprises maintaining disablement of all protocols of the first USB-C port.

3. The method recited in claim 1, wherein prior to the step of sending boot parameters, the method further comprises receiving instructions to disable at least one protocol of the first USB-C port, and to enable the one or more protocols of the first USB-C port.

4. The method recited in claim 3, wherein the step of sending boot parameters to the peripheral device further comprises sending boot parameters via the first and second USB-C ports to enable data connections within the peripheral device corresponding to the one or more protocols.

5. The method recited in claim 3, wherein the peripheral device is a docking station.

6. The method recited in claim 5, wherein the data connections within the docking station corresponding to the one or more protocols comprise audio, video and/or networking data connections.

7. The method recited in claim 3, wherein subsequent to the step of enabling one or more protocols of the first USB-C port, the method further comprises communicating data corresponding to the one or more protocols between the information handling system and the peripheral device via the first USB-C port and the second USB-C port.

8. A method for selectively enabling one or more protocols of a first USB-C port on an information handling system, the method comprising:
   determining, upon information handling system boot, if the first USB-C port on the information handling system is connected to a second USB-C port on a peripheral device that is authorized for use with the information handling system;
   disabling all protocols of the first USB-C port if the peripheral device is not authorized for use with the information handling system;
   wherein if the peripheral device is authorized for use with the information handling system, the method further conspires:
      sending boot parameters to the peripheral device via the first and second USB-C ports to disable all USB ports on the peripheral device that are downstream from the second USB-C port; and
      enabling one or more protocols, and disabling at least one protocol, of the first USB-C port on the information handling system.

9. The method recited in claim 8, wherein prior to the step of enabling the one or more protocols, the method further comprises receiving instructions to enable the one or more protocols of the first USB-C port, and to disable the at least one protocol of the first USB-C port.

10. The method recited in claim 9, wherein prior to the step of enabling the one or more protocols, the method further comprises sending boot parameters to the peripheral device via the first and second USB-C ports enable data connections within the peripheral device corresponding to the one or more protocols.

11. The method recited in claim 10, wherein the peripheral device is a docking station comprising the second USB-C port and one or more additional USB ports.

12. The method recited in claim 11, wherein the data connections within the docking station corresponding to the one or more protocols comprise audio, video and/or networking data connections.

13. The method recited in claim 10, wherein subsequent to the step of sending boot parameters, the method comprises receiving a message from the peripheral device indicating that configuration is complete.

14. The method recited in claim 13, wherein in response to receiving the message and enabling the one or more protocols of the first USB-C port, the method further comprises communicating data corresponding to the one or more protocols between the information handling system and the peripheral device via the first and second USB-C ports.

15. A system including an information handling system, the information handling system comprising:
   a USB-C port;
   a first processing device coupled to the USB-C port and configured to detect a docking connection to a USB-C port of a docking station; and
   a second processing device coupled to the first processing device and configured to determine whether the docking station is authorized for use with the information handling system;
   wherein if the docking station is authorized for use with the information handling system, the second processing device is further configured to send boot parameters to the docking station to disable USB data connections to all USB ports downstream from the USB-C port on the docking station.

16. The system as recited in claim 15, the information handling system further comprising one or more additional USB ports on a chassis of the information handling system.

17. The system as recited in claim 16, wherein the one or more additional USB ports and the USB-C port on the information handling system are disabled if the second processing device determines:
   the information handling system is not docked with a docking station upon system boot; or
   the information handling system is docked with a docking station upon system boot, but the docking station is not authorized for use with the information handling system.

18. The system as recited in claim 15, wherein if the docking station is authorized for use with the information handling system, the second processing device is further configured to send boot parameters to the docking station to enable other types of data connections within the docking station.

19. The system as recited in claim 18, the information handling system further comprising a third processing device coupled to the USB-C port and to the first processing device, wherein if the second processing device determines that the docking station is authorized for use with the information handling system, the third processing device is configured to communicate data corresponding to the enabled types of data connections to the USB-C port of the information handling system.

20. The system as recited in claim 18, further comprising a docking station comprising:
  a USB-C port;
  one or more additional USB ports downstream from the USB-C port; and
  a fourth processing device coupled to receive the boot parameters, which are sent from the second processing device in the information handling system.

* * * * *